United States Patent [19]

Kaneki et al.

[11] 4,380,405

[45] Apr. 19, 1983

[54] HEAD FLANGE MOUNTING DEVICE FOR TURBO-MACHINE

[75] Inventors: Tadashi Kaneki, Tsuchiura; Kazuo Takeda, Shimoinayoshi, both of Japan

[73] Assignee: Hitachi, Ltd., Tokyo, Japan

[21] Appl. No.: 221,457

[22] Filed: Dec. 30, 1980

[30] Foreign Application Priority Data

Jan. 7, 1980 [JP] Japan ........................ 55-150
Jan. 21, 1980 [JP] Japan ........................ 55-4595
Jan. 21, 1980 [JP] Japan ........................ 55-4596

[51] Int. Cl.³ .................... B25G 3/00; F16D 1/00; F16G 3/18
[52] U.S. Cl. .................... 403/318; 415/219 R; 403/356; 403/409
[58] Field of Search .............. 403/356, 369, 370, 374, 403/409, 316, 317, 318, 319; 411/216, 217, 218, 219; 415/219 R

[56] References Cited

U.S. PATENT DOCUMENTS

| | | | |
|---|---|---|---|
| 2,887,891 | 5/1959 | Pérez | 403/356 X |
| 2,954,638 | 10/1960 | Motter | 403/319 |
| 3,400,905 | 10/1968 | Van Dusen | 403/369 X |
| 3,486,348 | 12/1969 | Firth | 403/370 X |
| 4,078,276 | 3/1978 | Nunes | 403/370 X |
| 4,274,301 | 6/1981 | Katayama | 403/370 X |

FOREIGN PATENT DOCUMENTS 530831 8/1954 Belgium ........................ 403/318

Primary Examiner—Wayne L. Shedd
Attorney, Agent, or Firm—Antonelli, Terry & Wands

[57] ABSTRACT

A head flange mounting device for mounting a head flange on a casing in a turbo-machine, such as a centrifugal compressor, is disclosed which includes a plurality of slide keyways formed on the inner surface of the casing and on the outer circumferential surface of the head flange in such a manner that each slide keyway formed on the casing and each slide keyway formed on the casing and each slide keyway formed on the head flange are in juxtaposed relation to form a pair of slide keyways. A slide key is held in each pair of slide keyways so as to keep the center axis of the head flange in alignment with the center axis of the casing at all times.

13 Claims, 8 Drawing Figures

HEAD FLANGE MOUNTING DEVICE FOR TURBO-MACHINE

BACKGROUND OF THE INVENTION

1. Field of the Invention

This invention relates to a head flange mounting device for a turbo-machine, such as a centrifugal compressor, which provides an improved construction for mounting a head flange on the inner circumferential surface of a casing by means of a shear key.

2. Description of the Prior Art

As a turbo-machine starts its operation, the casing expands radially due to a rise in the temperature of the fluid handled and the internal pressure of the casing. With an increase in the temperature of the fluid handled, the head flange also expands radially, but the temperature in the central portion of the turbo-machine shows no appreciable rise. Combined with the structural relation between the casing and the flange, this renders the expansion of the head flange less in amount than that of the casing. In addition, the head flange is not restrained radially because it is mounted on the casing by means of a shear key. As a result, a clearance between the head flange and the casing grows larger in size with time after the startup of the machine, so that misalignment of the head flange and the casing might occur. This might bring about a misalignment of a labyrinth seal provided to the casing and a rotary shaft supported by the casing. There are possibilities that the labyrinth seal and the rotary shaft might be accidentally brought into contact with each other. In order to avoid such possibilities, the present practice in the turbo-machine manufacturing industry is to increase the clearance between the labyringth seal and the rotary shaft in design by taking into consideration the misalignment of the two parts that might occur during operation. Because of this, the head flange of a turbo-machine of the prior art has suffered the disadvantage that no satisfactory seal is provided.

To avoid a reduction in the effect achieved by sealing requires keeping the center axis of the head flange in alignment with the center axis of the casing at all times. Various proposals have hitherto been made to provide head flange mounting devices capable of mounting the head flange on the casing by fulfilling the aforesaid requirement. Some of these proposals will now be outlined, to enable the invention to be better understood.

In one head flange mounting device known in the art, the head flange mounted at its outer circumferential surface on the inner circumferential surface of an end portion of the casing by means of a shear key is forced against the casing by a plurality of fixed bolts extending through the casing in several circumferentially spaced positions, to avoid relative movements of the head flange and casing radially thereof. In this type of device, it is necessary that the operator tighten the fixed bolts to avoid displacement of the head flange from the casing as the clearance between the head flange and the casing increases in size with time following the initiation of an operation. A drop in the temperature of the head flange and the casing caused by interruption of the operation reduces the clearance between the head flange and the casing and requires loosening of the fixed bolts to avoid damage to the latter that have been tightened. This tightening and loosening of the fixed bolts is time consuming and causes a lot of trouble. Moreover, the arrangement whereby the head flange is forced against the casing by the fixed bolts makes it difficult to keep the head flange and the casing in alignment with each other at all times.

Another head flange mounting device of the prior art employs a plate instead of the fixed bolts of the first example which plate is attached to an end face of the casing to pull the head flange through check bolts, to thereby keep the head flange from moving in the radial direction. More specifically, frictional forces are generated on the surfaces of the casing and the shear key and the head flange and the shear key in contact with each other by the clamping forces of the check bolts, so that the relative movements of the head flange and the casing radially thereof can be prevented by the frictional forces generated in this way. The second example of the prior at suffers the disadvantage that the force tending to restrain the radial movements of the head flange and the casing is not high enough to achieve the desired result, the restraining force being influenced by the clamping force exerted by the check bolts and the coarseness of the contacting surfaces of the parts. The device of this example is not capable of keeping the center axis of the head flange in alignment with the center axis of the casing at all times, and the two parts tend to displace from each other due to vibration or thermal expansion during operation.

SUMMARY OF THE INVENTION

This invention has been developed for the purpose of obviating the aforesaid disadvantages of the prior art. Accordingly, one of the objects of the invention is to provide a head flange mounting device for a turbo-machine which is capable of reducing the size of a clearance between the labyrinth seal and the rotary shaft and thereby improving the performance of the turbo-machine while keeping the center axis of the head flange in alignment with the center axis of the casing at all times even if the clearance between the head flange and the casing increases in size or vibration is generated during operation.

Another object is to provide a head flange mounting device of the type described which is convenient to handle and which eliminates the need to tighten or loosen the fixed bolts as is done in one device of the prior art.

The outstanding characteristic of the invention that enables the aforesaid objects to be accomplished includes a plurality of pairs of slide keyways provided in a turbo-machine having a casing and a head flange mounted on the inner circumferential surface of an end portion of the casing by means of a shear key, one of two slide keyways forming each pair being provided on the inner circumferential surface of the casing inwardly of the shear key and the other slide keyway being provided on the outer circumferential surface of the head flange in such a manner that the two slide keyways are in juxtaposed relation. The pairs of slide keyways are formed at least in over two circumferentially spaced positions, and a slide key is held in each pair of slide keyways to avoid the radial relative movements of the head flange and the casing.

Additional and other objects, features and advantages of the invention will become apparent from the description set forth hereinafter when considered in conjunction with the accompanying drawings.

DESCRIPTION OF THE PREFERRED EMBODIMENTS

Figure 1:
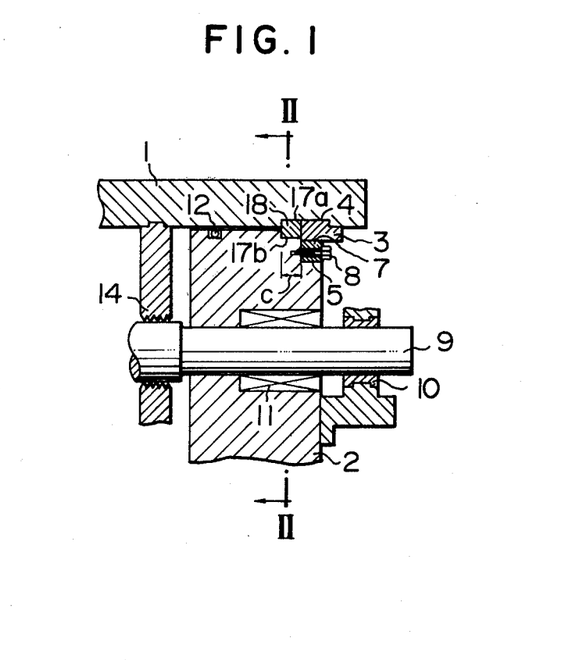
FIG. 1 is a vertical sectional view of the head flange mounting device comprising a first embodiment of the invention, showing the essential portions of the device.

FIG. 1 shows in a vertical sectional view a first embodiment of the head flange mounting device in conformity with the invention. The numeral 1 designates a casing of the barrel shape, and the numeral 2 designates a head flange mounted on the inner circumferential surface of an end portion of the casing 1 by means of a shear key 3. The shear key 3 is split into a plurality of circumferentially spaced pieces and held in a shear keyway 4 formed on the inner circumferential surface of an outer end of the casing 1, to keep the head flange 2 from being moved outwardly by the internal pressure. The numeral 5 is an annular offset portion formed in a position on the head flange 2 juxtaposed against the inner circumferential side of the shear key 3. An annular key keep member 7 is fitted in the offset portion 5 and held in place by bolts 8, to avoid dislodging of the shear key 3 from the shear keyway 4. The head flange 2 which performs the function of maintaining the internal pressure of the turbo-machine at the desired level supports a bearing 10 for journalling a rotary shaft 9, and shaft sealing means 11 and an O-ring 12 for preventing gas leakage to outside. The numeral 14 designates a labyrinth seal mounted on the inner circumferential surface of the casing 1 in slightly spaced relation to the rotary shaft 9.

To facilitate assembling and disassembling, a small clearance exists between the casing 1 and the head flange 2. Thus vibration of the rotary shaft 9 would cause a resonance of the head flange 2 supporting the rotary shaft 9 during operation. Also, following startup, the operation of the machine would cause a rise in the temperature of the fluid handled by the machine and the internal pressure of the machine, so that the casing 1 and the head flange 2 would expand. The amount of expansion of the casing 1 would be greater than that of the head flange 2, so that the clearance between the casing 1 and the head flange 2 would become increasingly smaller and an increasingly large misalignment would occur between the casing 1 and the flange 2. Thus there are possibilities that the labyrinth seal 14 and the rotary shaft 9 might be accidentally brought into contact with each other. This technical problem is obviated in the invention by the structural arrangement which will hereinafter be described in detail by referring to FIGS. 1 and 2.

Figure 2:
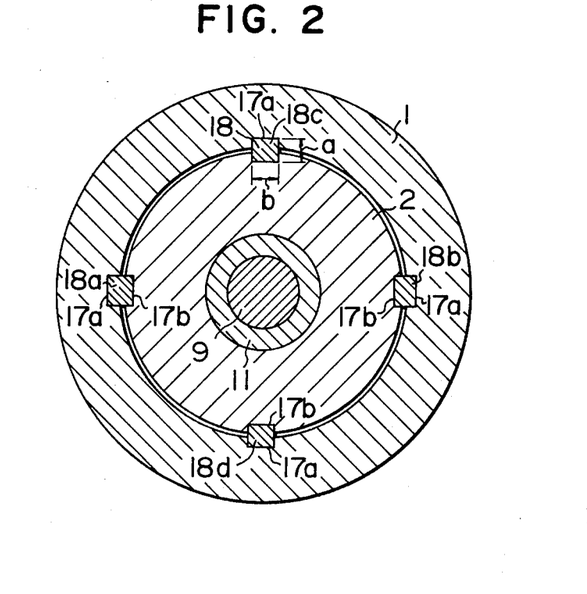
FIG. 2 is a view as seen in the directions of arrows II—II in FIG. 1.

As shown, slide keyways 17a and 17b are formed on the inner surface of the casing 1 inwardly of the shear key 3 and on the outer circumferential surface of the head flange 2 respectively in such a manner that the slide keyways 17a and 17b are at right angles to the respective surfaces. Each of the slide keyways 17a forms a pair with each of the corresponding slide keyways 17b in such a manner that four pairs of slide keyways are disposed in four positions circumferentially equidistantly spaced apart from one another, as shown in FIG. 2. A slide key 18 is held in each pair of slide keyways 17a and 17b in snugly fitting relation, and, as can be seen from FIG. 1, the shear key 3 prevents the slide keys 18 from axially dislodging from the keyways.

Each slide key 18 has dimensions a, b and c which may vary depending on a variable load caused by the vibration of the rotary shaft 9 and the weight of the head flange 2. When the casing 1 of the centrifugal compressor has an outer diameter of about 1300 mm, the dimensions a, b and c of the slide key 18 are 100, 60 and 60 mm respectively.

With this constructional arrangement, a vertical movement of the head flange 2 relative to the casing 1 can be prevented by the slide keys 18a and 18b disposed in horizontally spaced positions and a horizontal movement of the head flange 2 relative to the casing 1 can be prevented by the slide keys 18c and 18d disposed in vertically spaced positions, to enable the casing 1 and head flange 2 to be concentrically supported even if they show different elongations. More specifically, even if the casing 1 and head flange 2 show different elongations, the clearance between the slide key 18 and the slide keyways 17a and 17b forming a pair shows almost no increase because the slide key 18 and a portion of the casing 1 in its vicinity have substantially the same temperature as the head flange 2 and the slide key 18 and slide keyways 17a and 17b have very small dimensions as contrasted with the diameter of the casing 1. Thus the casing 1 and the head flange 2 can be kept concentric at all times. Since the head flange 2 is firmly secured to the casing 1, the center axis of the former is prevented from becoming out of alignment with the center axis of the latter even if the machine develops vibration. The occurrence of resonance of the head flange 2 can be avoided when the rotary shaft 9 vibrates following initiation of the operation of the machine. Thus the accident of the rotary shaft 9 being accidentally brought into contact with the labyrinth seal 14 can be positively avoided, and the clearance between the rotary shaft 9 and the labyrinth seal 14 can be reduced to improve the performance of the turbo-machine.

In the embodiment shown and described hereinabove, the head flange 2 is not axially fixed. However, when it is desired to axially fix it, a combination of a plate and check bolts described by referring to the second example of the prior art devices may be used or the outer diameter of the shear key keep member 7 may be made larger than the inner diameter of the slide keys 18. In the first embodiment shown and described hereinabove, the pairs of slide keyways 17a and 17b are arranged in four circumferentially equidistantly spaced positions. The invention is not limited to this specific number of the pairs of slide keyways and that substantially the same results can be achieved by using at least three pairs spaced circumferentially equidistantly from one another.

Figure 3:
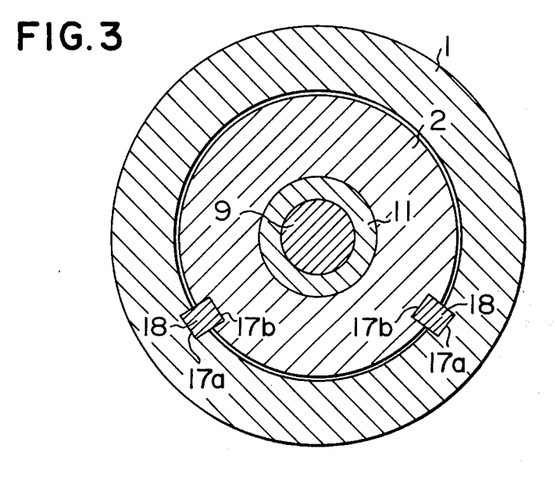
FIG. 3 is a sectional view similar to FIG. 2 but showing a second embodiment of the device in conformity with the invention.

FIG. 3 shows a second embodiment of the device in conformity with the invention in a sectional view similar to that shown in FIG. 2. In FIG. 3, parts similar to those shown in FIGS. 1 and 2 are designated by like reference characters. In this embodiment, the pairs of slide keyways 17a and 17b formed in the casing 1 and the head flange 2 are disposed only in two circumferentially spaced positions and yet are capable of achieving the same results as the pairs of slide keyways 17a and 17b disposed in four positions in the first embodiment. The slide keyways 17a are disposed at right angles to the inner surface of the casing 1, and the slide keyways 17b are disposed at right angles to the outer circumferential surface of the head flange 2, with each slide keyway 17a in the casing 1 being juxtaposed against the corresponding slide keyway 17b in the head flange 2 to form a pair. The two pairs of slide keyways 17a and 17b are not located symmetrically with respect to the center axis of the casing 1 or the head flange 2, and the slide key 18 is held in each pair of slide keyways 17a and 17b to avoid radial movement of the head flange 2 with respect to the casing 1. In case two pairs of slide keyways 17a and 17b are located in two circumferentially spaced positions in such a manner that one pair of slide keyways 17a and 17b is symmetrical with the other pair of slide keyways 17a and 17b with respect to the center axis of the casing 1 or the head flange 2, the movement of the head flange 2 from one pair of slide keyways 17a and 17b toward the other pair of slide keyways 17a and 17b would not be restrained, thereby making it impossible for the slide keyways 17a and 17b to achieve the same results as achieved by the slide keyways 17a and 17b shown in FIGS. 1 and 2. The pairs of slide keyways 17a and 17b are preferably arranged such that a line connecting the center axis of the casing 1 or the head flange 2 to each pair of slide keyways 17a and 17b is as much nearly horizontal as possible, to lessen the load applied to the slide keys 18 which support the weight of the head flange 2. By arranging the pairs of slide keyways 17a and 17b as described hereinabove, it is possible to keep the casing 1 and the head flange 2 in concentric relation even if they show different elongations, with only two pairs of slide keyways 17a and 17b being located in two positions.

Figure 4:
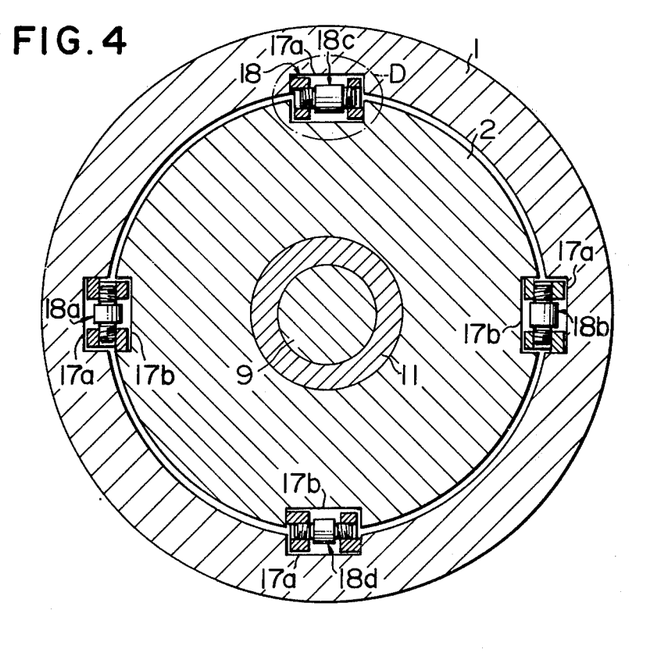
FIG. 4 is a sectional view similar to FIG. 2 but showing a third embodiment of the device in conformity with the invention.
Figure 5:
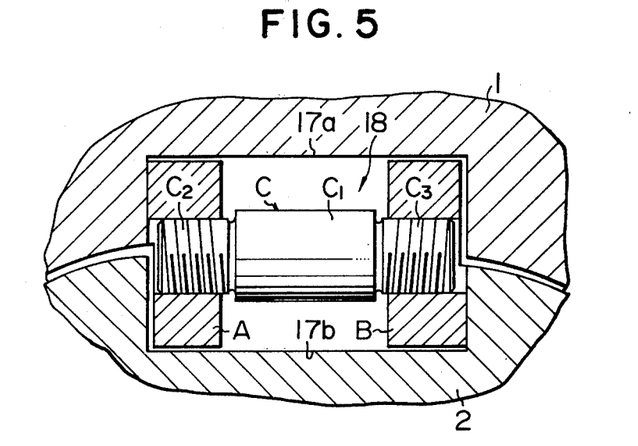
FIG. 5 is a view, on an enlarged scale, of a portion D shown in FIG. 4.

FIGS. 4 and 5 show a third embodiment of the device in conformity with the invention, FIG. 4 being a sectional view similar to FIG. 2 and FIG. 5 showing, on an enlarged scale, a portion D in FIG. 2. In FIGS. 4 and 5, parts similar to those in FIGS. 1 and 2 are designated by like reference characters. In this embodiment too, the slide keyways 17a and 17b are formed on the inner surface of the casing 1 inwardly of the shear key 3 for preventing the head flange 2 from being moved outwardly by the internal pressure and on the outer circumferential surface of the head flange 2 respectively in such a manner that each slide keyway 17a forms a pair with the corresponding slide keyway 17b. The pairs of slide keyways 17a and 17b are located in four circumferentially equidistantly spaced positions as shown in FIG. 4. The slide key 18 (18a, 18b, 18c, 18d) is held in each pair of slide keyways 17a and 17b and includes a casing keep key member A, a head flange keep key member B, and a cross-bridging bolt C threaded into the two key members A and B for holding them apart from each other as shown in FIG. 5. The cross-bridging bolt C includes a central portion $C_1$ to which a wrench may be applied, a left-threaded portion $C_2$ disposed on one side of the central portion $C_1$, and a right-threaded portion $C_3$ disposed on the other side thereof. The casing keep key member A having a portion positioned against the casing 1 is threadably connected to the left-threaded portion $C_2$, and the head flange keep key member B is threadably connected to the right-threaded portion $C_3$. Of the four slide keys 18 located in four circumferentially spaced positions, the adjacent slide keys 18 have their casing keep key members A and head flange keep key members B arranged in such a manner that when the cross-bridging bolts C are rotated the head flange 2 can be rotated in the opposite direction. That is, as shown in FIG. 4, the slide key 18c is capable of rotating the head flange 2 clockwise in the figure, and the slide keys 18a and 18b adjacent the slide key 18c are capable of rotating the head flange 2 counterclockwise in the figure. The slide key 18d adjacent the slide keys 18a and 18b is capable of rotating the head flange 2 clockwise in the figure. By this arrangement, it is possible to prevent relative axial movement of the head flange 2 with respect to the casing 1 and to keep the casing 1 and the head flange 2 in concentric relation even if the casing 1 and the head flange 2 show different elongations during operation. The manner in which the third embodiment described hereinabove is assembled will be described. Following assemblies of built-in parts with the casing 1, the head flange 2 is assembled and then the slide keys 18 are mounted. In mounting each slide key 18, the casing keep key member A and head flange keep key member B are threadably fitted deep on the cross-bridging bolt C and the latter is rotated to move the members A and B near the central portion $C_1$, to narrow the width of the slide key 18 relative to the width of the keyways 17a, 17b, so that they can readily be inserted into the keyways. The slide key 18 in this state is mounted in each pair of slide keyways 17a and 17b disposed in four positions. Then the cross-bridging bolt C of each slide key 18 is rotated in a direction opposite the direction in which it was rotated previously to move the members A and B away from each other, so that the casing keep key member A is forced against the casing 1 and the head flange keep key member B is forced against the head flange 2 to hold the casing 1 and head flange 2 firmly in position. As indicated above, bolt C has a portion $C_1$ to which a wrench can be applied; thus, one skilled in the art will appreciate that a vise-type wrench can be used if portion $C_1$ is of circular cross section or portion $C_1$ could be given a square or hexagonal cross section for enabling it to be turned by an open-end wrench or even Allen wrench openings for enabling turning thereof by insertion of the long end of an Allen wrench into such openings. In this way, the center axis of the head flange 2 is brought into alignment with the center axis of the casing 1 by means of the slide keys 18a, 18b, 18c and 18d. By tightening the cross-bridging bolt C of each slide key 18 after bringing the casing 1 and head flange 2 in concentric relation, the width of the slide keys 18 can accommodate a slight increase in the width of the slide keyways 17a and 17b which might be caused by thermal expansion of the casing 1 and head flange 2 during operation. Thus the head flange 2 can be kept in concentric relation to the casing 1 with a high degree of accuracy by avoiding play that might otherwise be produced between the slide keyways 17a and 17b and the slide key 18. The effects achieved by the invention can be further increased by providing the cross-bridging bolt C with a recoil stop to prevent a reduction in the strutting force exerted thereby from taking place.

The embodiment of the invention described hereinabove can achieve the following effects. The feature that each slide key 18 comprises the casing keep key member A and the head flange keep key member B as well as the cross-bridging bolt C and can have its width adjusted as desired eliminates the need to machine the slide keyways 17a and 17b with a high degree of precision finishes to obtain an accurate value for the width as is the case with the first and second embodiments. Also, the need to bring the positions in which the slide keyways 17a are formed in the casing 1 and the slide keyways 17b are formed in the head flange 2 into agreement with one another with high accuracy is eliminated, so that machining of the casing 1 and head flange 2 to form the slide keyways 17a and 17b is facilitated. Since each slide key 18 is mounted in one of the pairs of slide keyways 17a and 17b in a state in which the width thereof is reduced, there is no trouble in mounting the slide keys 18 in the pairs of slide keyways 17a and 17b. The slide keys 18 can be mounted in the pairs of slide keyways 17a and 17b even if the center axis of the head flange 2 is out of alignment with the center axis of the casing 1, thereby facilitating assembling.

In the third embodiment, the pairs of slide keyways are described as being located in four circumferentially equidistantly spaced positions. However, the invention is not limited to this specified number of the slide keyways and the positions in which they are located, and they can be located in more than four positions circumferentially spaced apart from one another.

Figure 6:
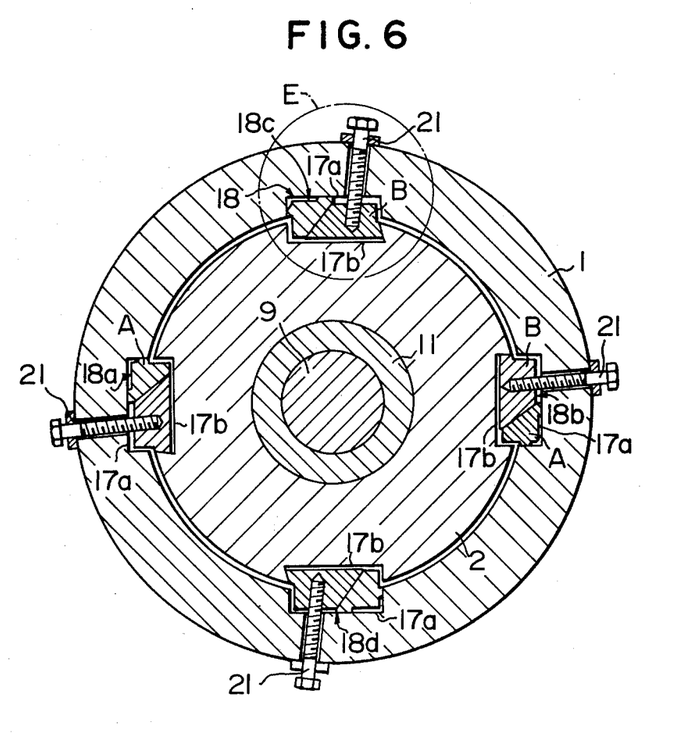
FIG. 6 is a sectional view similar to FIG. 2 but showing a fourth embodiment of the device in conformity with the invention.
Figure 7:
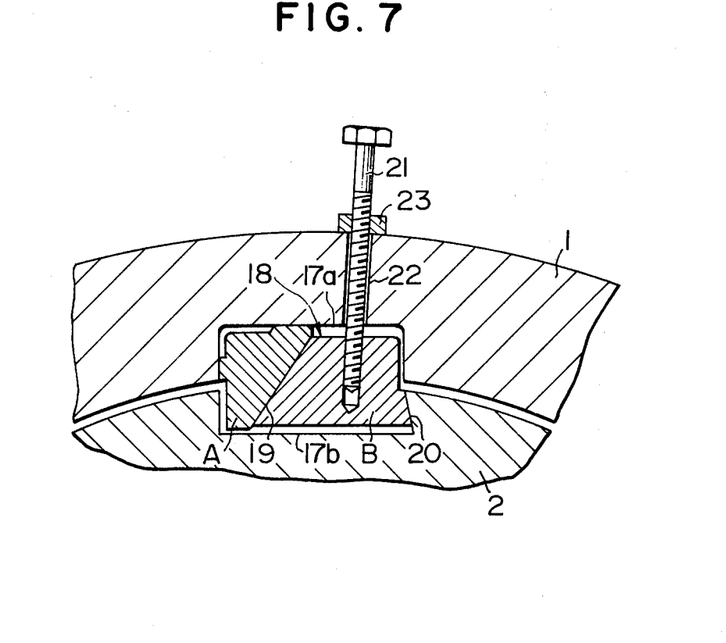
FIG. 7 is a view, on an enlarged scale, of a portion E shown in FIG. 6.
Figure 8:
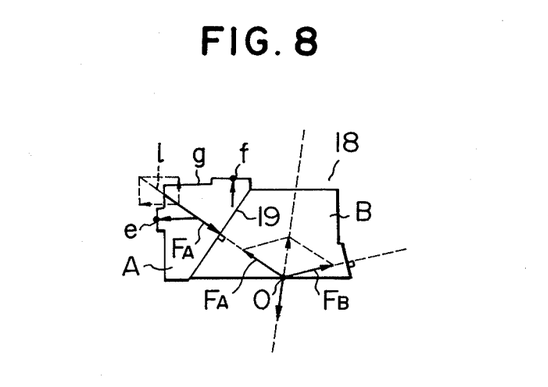
FIG. 8 is a view in explanation of the detailed construction of a slide key.

FIGS. 6–8 show a fourth embodiment of the device in conformity with the invention, FIG. 6 being a sectional view similar to FIG. 2, FIG. 7 being a view, on an enlarged scale, of the portion E shown in FIG. 6, and FIG. 8 being a view in explanation of the detailed construction of the slide keys shown in FIGS. 6 and 7. In FIGS. 6–8, parts similar to those shown in FIGS. 1 and 2 are designated by like reference characters.

The slide keyways 17a and 17b forming pairs are formed on the inner surface of the casing 1 inwardly of the shear key 3 preventing the head flange 2 from being moved outwardly by the internal pressure and on the outer circumferential surface of the head flange 2 respectively. The pairs of slide keyways 17a and 17b are located in four circumferentially equidistantly spaced positions as shown in FIG. 6, and the slide key 18 (18a, 18b, 18c and 18d) is held in each pair of slide keyways 17a and 17b and includes, as shown in FIG. 7, a casing keep key member A and a head flange keep key member B. The keep key members A and B are shaped such that abutting surfaces 19 of the members A and B in abutting engagement with each other and abutting surfaces 20 of the key member B and the head flange 2 in abutting engagement with each other are oblique and complementary with each other. A tension bolt 21 is fitted in a bore 22 formed in the casing 1 to penetrate the slide keyway 17a and has a nut 23 threadably mounted thereon. The tension bolt 21 has a threaded forward end portion which is threadably connected to the head flange keep key member B. By turning the nut 23 in a tightening direction, it will be appreciated that, since the outer surface of casing 1 will preclude movement of the nut 23, a force moving the tension bolt radially outwardly of the casing 1, will be exerted, thus making it possible to move the casing keep key member A and the head flange keep key member B in the radial direction within the keyways 17a, 17b. The oblique abutting surfaces 19 are inclined such that the width of the head flange keep key member B at its radially inner end is greater than the width thereof at its radially outer end. Thus when the head flange keep member B is moved radially outwardly with respect to the casing keep key member A by means of the tension bolt 21, the slide key 18 composed of the members A and B has its width increased, so that the casing keep key member A and the head flange keep key member B can be forced against the casing 1 and the head flange 2 respectively. The oblique abutting surfaces 20 are inclined such that the width of the head flange keep key member B at its radially inner end is greater than the width thereof at its radially outer end. Thus when the head flange keep key member B is moved radially outwardly with respect to the head flange 2, the head flange keep key member B can be strongly forced against the head flange 2.

The inclination of the oblique abutting surfaces 19 is set such that, as shown in FIG. 8, an extension l of a force $F_A$ acting on the oblique abutting surfaces 19 passes between points e and f at which forces exerted by the casing 1 and the casing keep key member A respectively are applied so that the turning moment acting on the casing keep key member A can be balanced. In this embodiment, a cutout g is formed in the casing keep key member A so that this turning moment can be balanced. Application of a bending force to the tension bolt 21 can be avoided by arranging the tension bolt 21 in such a manner that it passes through the intersection 0 of Forces $F_A$ and $F_B$ acting on the oblique abutting surfaces 19 and 20 respectively.

In each of the slide keys 18 arranged in four circumferentially spaced positions, the casing keep key member A and the head flange keep key member B are mounted therein in such a manner that when the tension bolts 21 of the circumferentially adjacent slide keys are moved to move the head flange keep key members B radially outwardly with respect to the casing keep key members A, the head flange 2 can be rotated in opposite directions. More specifically, in this embodiment, the slide key 18c is capable, as shown in FIG. 6, of rotating the head flange clockwise, so that the slide keys 18a and 18b disposed adjacent the slide key 18c are capable of rotating the head flange 2 counterclockwise. The slide key 18d disposed adjacent the slide keys 18a and 18b is capable of rotating the head flange 2 clockwise. By this arrangement, radial movements of the head flange 2 with respect to the casing 1 can be avoided and the center axis of the head flange 2 can be maintained in alignment with the center axis of the casing 1 even if the casing 1 and the head flange 2 show different elongations. Also, the feature that the abutting surfaces 20 of the head flange keep key member B and the head flange 2 abutting against each other are oblique enables the width of the slide key 18 to accommodate an increase in the width of the slide keyways 17a and 17b formed in the casing 1 and the head flange 2 respectively which might be caused by thermal expansion of the casing 1 and the head flange 2. More specifically, the thermal expansion of the casing 1 is greater than that of the head flange 2 so that the head flange keep key members B connected to the casing 1 through the tension bolts 21 move radially outwardly with respect to the head flange 2 when thermal expansion takes place, to thereby strongly press against the head flange 2. Thus this feature is conductive to the prevention of the production of play between the slide keyways 17a and 17b and the slide key 18 at the time of thermal expansion, and maintaining the center axis of the head flange 2 in alignment with the center axis of the casing 1 with a high degree of accuracy. In place of providing the oblique surfaces 20, the tension bolts 21 may be tightened to a greater degree beforehand, to enable the width of the slide keys 18 to accommodate a slight increase in the width of the slide keyways 17a and 17b that might occur at the time of thermal expansion.

The manner in which the fourth embodiment described hereinabove is assembled will be described. Following assembling of built-in parts with the casing 1, the head flange 2 is assembled and then the slide keys 18 are mounted. In mounting each slide key 18, the width of the slide key 18 can be reduced and assembling is facilitated by arranging the casing keep key member A in a radially outward portion of the pair of slide keyways 17a and 17b and arranging the head flange keep key member B in a radially inward portion thereof. This enables each slide key 18 to be mounted in one of the pairs of slide keyways 17a and 17b without any trouble even if the center axis of the head flange 2 is out of alignment with the center axis of the casing 1. Thereafter, by moving each tension bolt 21 to move the head flange keep key member B radially outwardly with respect to the casing keep key member A to increase the width of the slide key 18, it is possible to press the casing keep key member A and the head flange keep key member B against the casing and the head flange 2 respectively. In this way, the center axis of the head flange 2 can be brought into alignment with the center axis of the casing 1 by adjusting the widths of the slide keys 18a, 18b, 18c and 18d located in four circumferentially spaced positions. In this embodiment, each slide key 18 is mounted in the respective pair of slide keyways 17a and 17b in a reduced width state. Thus the need to machine the casing 1 and the head flange 2 to form the slide keyways 17a and 17b respectively therein with a high degree of precision finishes as is required in the first and second embodiments is eliminated. Also, the need to bring the positions in which the slide keyways 17a are formed in the casing 1 and the slide keyways 17b are formed in the head flange 2 into agreement with one another with high accuracy is eliminated. Since each tension bolt 21 can be tightened by manipulation from outside the casing 1, the degree of tightening can be readily increased.

In the foregoing description of the fourth embodiment, the pairs of slide keyways have been described as being located in four circumferentially equidistantly spaced positions. However, it is to be understood that the invention is not limited to this specific number and position of the pairs of slide keyways, and that the number of the circumferentially spaced positions for mounting the slide keyways may be more than four. The provision of the oblique abutting surfaces between the flange keep key member B and the head flange 2 has the aforesaid effects. However, the provision of the oblique abutting surfaces 20 is not essential. The direction of inclination of the oblique abutting surfaces between the casing keep key member A and the head flange keep key member B described in the foregoing description of the fourth embodiment may be reversed. In this case, one has only to construct each slide key in such a manner that the casing keep key member is pulled by the tension bolt and the outer radial end portion of the flange keep key member is positioned against the casing.

In the head flange mounting device for a turbo-machine according to the invention, the slide keys are used for preventing the head flange from moving radially with respect to the casing. The device is capable of achieving the effect of keeping the center axis of the head flange in alignment with the center axis of the casing even if an increase in the clearance between the casing and the head flange causes vibration to occur. This makes it possible to reduce the clearance between the labyrinth seal and the rotary seal, to thereby improve the performance of the turbo-machine. The head flange mounting device according to the invention eliminates the need to tighten or loosen the fixed bolts by the operator during operation as is the case with the first example of the prior art devices described in the background of the invention, thereby facilitating handling.

What is claimed is:

1. A head flange mounting device for a turbo-machine comprising a casing, a head flange, a shear key for mounting the head flange on the inner circumferential surface of an end portion of the casing, a rotary shaft supported by a bearing on said head flange, and a labyrinth seal supported by said casing to seal a gap between said rotary shaft and said casing, such head flange mounting device comprising:

at least two pairs of slide keyways formed circumferentially spaced apart from one another, one slide keyway of each pair being formed on the inner surface of said casing at a right angle thereto inwardly of said shear key and the other slide keyway being formed on the outer circumferential surface of said head flange at a right angle thereto so that the two slide keyways are juxtaposed against each other; and a slide key held in each pair of slide keyways in a manner preventing the relative movement of the head flange radially with respect to the casing.

2. A head flange mounting device as set forth in claim 1, wherein the pairs of slide keyways located in at least over two positions spaced apart from one another circumferentially of the casing and the head flange with one slide keyway of each pair being formed on the inner surface of the casing inwardly of the shear key and the other slide keyway being formed on the outer circumferential surface of the head flange are two in number, said two pairs of slide keyways formed in two positions being located such that they are not symmetrical with each other with respect to the center axis of the casing or the head flange.

3. A head flange mounting device as set forth in claim 1, wherein the pairs of slide keyways located in at least two positions spaced apart from one another circumferentially of the casing and the head flange with one slide keyway of each pair being formed on the inner surface of the casing inwardly of the shear key and the other slide keyway being formed on the outer circumferential surface of the head flange are at least three in number.

4. A head flange mounting device as set forth in claim 3, wherein the pairs of slide keyways located circumferentially of the casings and the head flange are at least four in number.

5. A head flange mounting device as set forth in claim 4, wherein four pairs of slide keyways are each formed in one of four positions equidistantly spaced apart from one another circumferentially of the casing and the head flange.

6. A head flange mounting device as set forth in any one of claims 1, and 5, wherein the pairs of slide keyways are formed in at least four positions spaced apart from one another circumferentially of the casing and the head flange, and each of said slide keys is held in one of the pairs of slide keyways and comprises a casing keep key member, a head flange keep key member and a cross-bridging bolt threadably connected to said casing keep key member and said head flange keep key member and adapted to exert a strutting force thereon.

7. A head flange mounting device as set forth in claim 1, wherein the pairs of slide keyways are formed in at least four positions spaced apart from one another circumferentially of the casing and the head flange, and each of said slide keys is held in one of the pairs of slide keyways and comprises a casing keep key member and a head flange keep key member supported for relative axial movements by a radially adjustable tension bolt extending through a bore in the casing and connected to one of said casing and head flange keep key members, said casing keep key member and said head flange keep key member being formed with oblique abutting surfaces at which the two key members abut against each other, so that the casing keep key member and said head flange keep key members can apply a strutting force to the casing and the head flange respectively by their relative movements.

8. A head flange mounting device as set forth in claim 7, wherein said casing keep key member and said head flange keep key member are formed with said oblique abutting surfaces in such a manner that the head flange keep key member is pressed strongly against the head flange as the head flange keep key member is moved radially outwardly with respect to the head flange.

9. A head flange mounting device as set forth in claim 7 or 8, wherein said head flange keep key member is pulled by the tension bolt, and said casing keep key member includes a radially outward end portion positioned against the casing.

10. A head flange mounting device as set forth in claim 7 or 8, wherein said casing keep key member is pulled by the tension bolt, and said head flange keep key member includes a radially outward end portion positioned against the casing.

11. A head flange mounting device according to claim 1 or 5, wherein each of said slide keys comprises a casing keep key member and a head flange keep key member and means for shifting said casing and head flange keep key members relative to each other widthwise with a respective pair of slide keyways.

12. A head flange mounting device according to claim 11, wherein said means for shifting is a cross-bridging bolt threadably connected to said casing keep key member and said head flange keep key member.

13. A head flange mounting device according to claim 11, wherein said means for shifting comprises a radially adjustable tension bolt extending through a bore in said casing and connected to one of the casing and head flange keep key members, said casing keep key member and said head flange keep key member abut against each other with oblique abutting surfaces.

* * * * *